United States Patent [19]

Ver Planck et al.

[11] 3,883,809

[45] May 13, 1975

[54] SUPERREGENERATIVE MIXERS AND AMPLIFIERS

[75] Inventors: Peter Ver Planck, Arlington; Godfrey T. Coate, Belmont, both of Mass.

[73] Assignee: Massachusetts Institute of Technology, Cambridge, Mass.

[22] Filed: Dec. 11, 1970

[21] Appl. No.: 97,332

Related U.S. Application Data

[63] Continuation of Ser. No. 637,743, May 11, 1967, abandoned.

[52] U.S. Cl. ............... 325/429; 329/170; 330/61 A
[51] Int. Cl. ............................................. H03d 1/22
[58] Field of Search ........... 325/428, 429, 430, 318, 325/449, 350; 329/168, 170, 171; 321/60, 69 R; 331/174; 330/112, 61 A, 61 R, 34

[56] References Cited

UNITED STATES PATENTS

| | | | |
|---|---|---|---|
| 2,865,987 | 12/1958 | Megard | 325/430 X |
| 2,874,278 | 2/1959 | Berge et al. | 325/430 X |
| 3,040,267 | 6/1962 | Seidel | 330/61 A |
| 3,125,725 | 3/1964 | Chang | 325/449 |
| 3,235,814 | 2/1966 | Skalski et al. | 330/61 A |
| 3,260,953 | 7/1966 | Kaufman et al. | 330/61 A |

OTHER PUBLICATIONS

Radio News February 1937, pp. 472, 473 and 489.

*Primary Examiner*—Benedict V. Safourek
*Attorney, Agent, or Firm*—Arthur A. Smith, Jr.; Robert Shaw; Martin M. Santa

[57] ABSTRACT

A superregenerative circuit wherein a tunnel diode or other active device serves to amplify a radio-frequency input signal and which may serve, also, to mix the input signal with a local oscillation to provide an intermediate-frequency output, the local oscillation being a harmonic of the quench-frequency oscillation applied to the tunnel diode or other active device to produce superregeneration.

17 Claims, 6 Drawing Figures

*INVENTORS:*
PETER VER PLANCK
GODFREY T. COATE
*ATTORNEY:*

*INVENTORS:*
PETER VER PLANCK
GODFREY T. COATE
*ATTORNEY:*

SUPERREGENERATIVE MIXERS AND AMPLIFIERS

This is a continuation of application Ser. No. 637,743, filed May 11, 1967 and now abandoned.

Mixers employing diodes have been widely used in the receiver-input circuits of, for example, microwave systems for radar and communication apparatus. Tunnel diodes are particularly attractive for such systems because of the low cost of the tunnel-diode circuitry, simplicity, resistance to mechanical shock and nuclear radiation, and solid-state reliability. In such systems the tunnel diode may be used as a radio-frequency amplifier ahead of a conventional mixer and local oscillator, or, in other circuits, a tunnel-diode converter is placed at the receiver radio-frequency input to convert or mix to an intermediate frequency directly, providing, by regeneration, a modest gain.

In the usual tunnel-diode amplifier circuit, amplification is obtained by regeneration, although it has been proposed that superregeneration be used, superregeneration referring to circuits wherein regenerative gain is varied periodically at a so-called quench frequency so that the signal being amplified builds up for a time period and is periodically damped, in a manner that is later described herein, to substantially a zero value. The superregenerative circuit is capable of much higher amplification than the regenerative circuit, but quenching to achieve superregeneration requires periodic application of a quench voltage of substantial magnitude to the tunnel diode, and harmonics of the quench-voltage oscillation beat with the signal to produce noise in the output of the amplifier. Furthermore, the ordinary superregenerative circuit amplifies unwanted input signals and noise throughout a wide frequency band to substantially the same extent that it amplifies wanted signals and thus cannot be used where rejection of such unwanted signals and noise is required. Also, the ordinary superregenerative circuit responds to the amplitude of the input signal, but does not preserve the input-signal phase, and therefore cannot be used in communication and radar systems that require phase coherence of input and output signals.

The present invention contemplates use of the otherwise objectionable quench-oscillation harmonics, it being an object of the invention to provide a superregenerative mixer in which mixing is effected by a tunnel diode using as the local oscillation a harmonic of the quench oscillation.

Another object is to provide a superregenerative mixer in which, because of superregenerative amplification effected by the tunnel diode, the power level of the output signal is greater than that of the input signal.

Still another object is to provide a superregenerative mixer circuit adapted to remove unwanted frequencies from the radio-frequency input signal prior to amplification.

A further object is to provide a superregenerative mixer circuit in which phase coherence is maintained between the input and output signals.

A still further object is to provide a superregenerative amplifier adapted to remove unwanted frequencies from the radio-frequency input signal prior to amplification.

Other and further objects (including the provision of amplifying and mixing means other than a tunnel diode) will be apparent in the specification to follow and will be more particularly delineated in the appended claims.

By way of summary, broadly, the objects of the present invention are obtained in a superregenerative mixer adapted to receive a radio-frequency signal, a tunnel diode (or other active device) being provided to amplify the signal. A resonant circuit is connected to the tunnel diode, the parameters of the circuit being such that it will resonate at approximately the center frequency of the input signal. Means is provided for applying a quench voltage to the diode to damp oscillations in the resonant circuit. Although the quench means may be a generator connector across the tunnel diode, quenching may also be effected by oscillations generated by the diode itself. Harmonics of the quench oscillation near the resonant frequency are amplified by the tunnel diode, as is also the input signal, and the thus amplified harmonics and input signal are mixed in the tunnel diode to produce a resultant intermediate-frequency signal which, in turn, is fed to an intermediate-frequency filter.

The invention will now be described in connection with the appended drawings in which.

Figure 1:
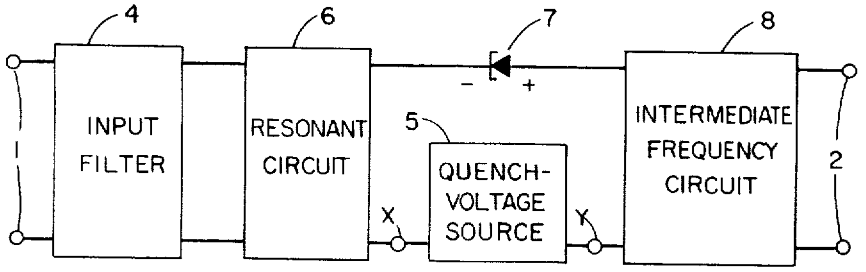
FIG. 1 is a circuit diagram, in block-diagram form, of a superregenerative mixer employing a tunnel diode.
Figure 5:
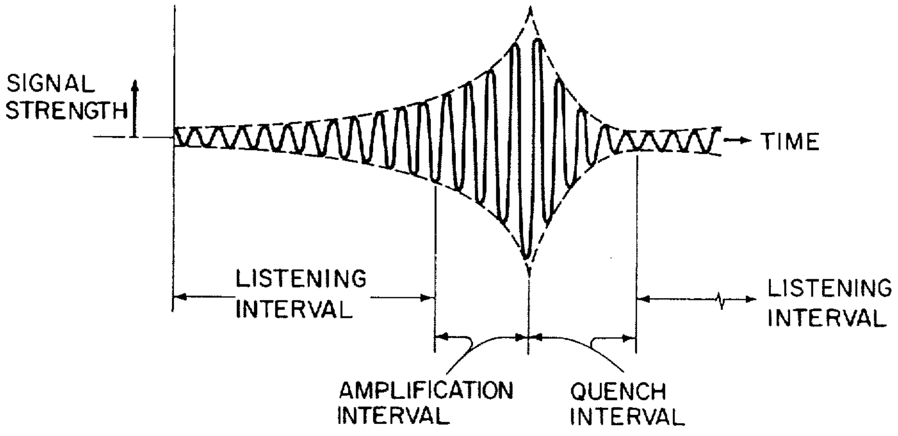

FIG. 5 is a graph showing the output-voltage waveforms of a typical tunnel diode superregenerative amplifier. Referring to FIG. 1, a superregenerative mixer is shown having an input 1—1 to receive a radio-frequency signal. The input signal may pass directly to a resonant circuit 6, or, for reasons later discussed herein, the input may pass through an input filter 4 to the said resonant circuit. The resonant circuit 6, which has its resonant frequency substantially at the center frequency of the input signal, is connected to a tunnel diode 7. The tunnel diode serves to amplify the input signal and, as later discussed in greater detail, serves also as a mixer wherein the signal is mixed with a local oscillation to produce a resultant intermediate-frequency signal which in turn passes to an intermediate-frequency circuit 8 where it is separated from signals of other frequencies and applied to an output 2—2.

Figure 3:
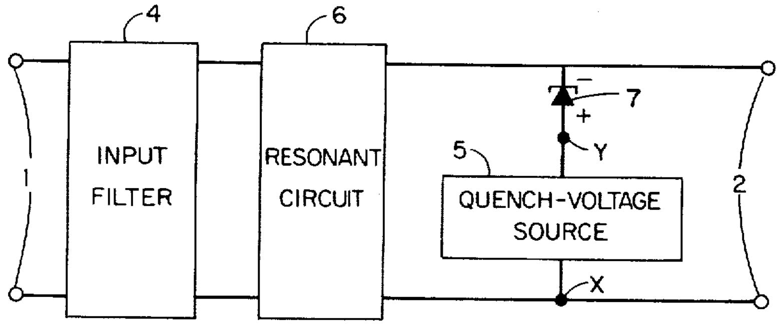
FIG. 3 is a circuit diagram, in block diagram form, of a superregenerative amplifier with an input filter.
Figure 4:
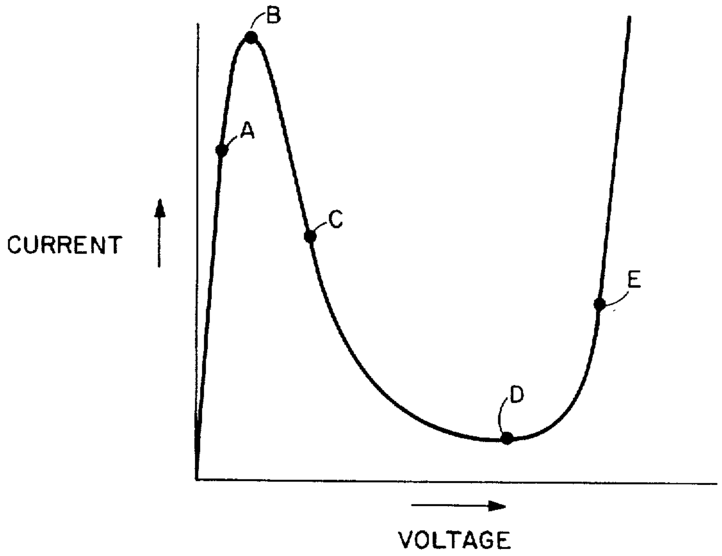
FIG. 4 is a graph of current vs. voltage for a typical tunnel diode.

The superregenerative mixer serves, first, as a superregenerative amplifier (as particularly shown in FIG. 3), i.e., the regenerative gain produced by the negative resistance of the tunnel diode is varied periodically at quench frequency by a quench-voltage source 5 so that signal-frequency oscillations in the resonant circuit periodically grow and decay. The action of growing and decaying is obtained by moving the tunnel-diode operating point, by means of the voltage supplied by the quench-voltage source 5, back and forth between regions of negative and positive incremental conductance as, for example, between points C and A, respectively, on the curve of FIG. 4. During the time, designated as the "Listening Interval" in FIG. 5, the operating point is at or near point B in FIG. 4, there is substantially neither damping nor amplification of the signal. At the end of the listening interval, the quench voltage is increased so that the diode operating point shifts to a position near C, where amplification takes place, and the signal level grows rapidly in magnitude until the quench-voltage is quickly decreased to shift the tunnel-diode operating point to a position near A on the curve, where damping takes place. The periods of amplification and damping are designated "Amplification Interval" and "Quench Interval," respectively, in FIG. 5. At the end of the quench interval, a second listening interval begins. The entire cycle is repeated periodically at a frequency called the quench frequency, which must be much less than the signal frequency in order for substantial superregenerative gain to be achieved. Similar functioning results if the quench voltage is adjusted for diode operation in a region surrounding point D in FIG. 4. Operation at D produces the listening interval; operation near C produces the amplification interval; and operation near E produces the quench interval. The shape of the quench-voltage wave determines the relative durations of each of these intervals. The quench waveform may be sinusoidal, but rectangular waves and sawtooth waves have also been used.

The superregenerative mixer serves, second, as a mixer to generate an intermediate-frequency output signal by combining the amplified input signal, produced in the manner just described, with a locally generated oscillation having a frequency almost equal to the signal frequency. The intermediate frequency is the difference between the frequencies of the signal and the local oscillation and is generated because of the nonlinearity of the tunnel-diode current-voltage characteristic curve shown in FIG. 4. The local oscillation in the present device is the sum of a set of high-order harmonic components of the quench-voltage waveform. Harmonics of the quench frequency near the signal frequency are amplified by the circuit in the same way as is the signal; consequently, these harmonics are large in magnitude even though the quench-voltage source, by itself, may produce high-order harmonics of negligible importance. In superregenerative amplifiers, these harmonics sometimes called the "self-signal" of the amplifier, are undesirable. In the superregenerative mixer, the self-signal is used as a local oscillation to produce the intermediate-frequency output signal. Both the amplified input signal and the self-signal have the waveform shown in FIG. 5. Therefore, each consists of many frequency components spaced by the quench frequency, with each self-signal component offset from the nearest frequency signal component by a difference frequency $\Delta f$ determined by the quench-frequency adjustment. The mixing of the two signals produced by diode nonlinearities generates new frequency components at all the sum and difference frequencies; that is, at all the frequencies $nf_q \pm \Delta f$ where $f_q$ is the quench frequency and $n$ is any integer. Any of these frequencies can be selected as the intermediate frequency by adjusting the intermediate-frequency circuit 8 in FIG. 1 to pass the desired frequency to the output 2—2. In practice, the lowest generated frequency, $\Delta f$, is usually chosen as the intermediate frequency. The phase of the intermediate-frequency output signal is coherently related to that of the input signal, as in any mixer, provided that the local oscillation is derived from a source that is coherent with the input signal. Therefore, for the superregenerative mixer, the requirement for phase coherence is that the quench frequency be derived from a coherent source. Such coherence can be established by phase-locking methods well known in the art, as for example, by synchronizing the quench oscillator 10 in FIG. 2 with the output of a frequency divider 20' driven at the input-signal frequency by signals from a radio-frequency signal source 20'' from which the input to 1—1 in FIG. 2 is also derived.

In practical circuits the incoming signal is a high radio frequency, usually in the ultrahigh-frequency or microwave region; the quench frequency is, relatively, much lower; and the intermediate frequency usually is lower still. The quench frequency used must be at least twice the maximum modulation frequency of the input signal and it is chosen, further, to give a harmonic of appropriate value for beating against the input signal to produce the intermediate-frequency output.

The input filter 4 can be omitted from a superregenerative mixer or amplifier, as previously stated; in fact, the superregenerative amplifier without an input filter is well-known in the prior art. Such circuits are useful in certain communication receivers that are required to provide but little discrimination against noise and unwanted signals, but have the disadvantage of an acceptance band for radio-frequency signals several times greater than the quench frequency, and hence much broader than the band occupied by the desired signal. One aspect of the present invention is the use of an input filter 4 between the input 1—1 and the resonant circuit 6 to yield an acceptance band no larger than the desired-signal bandwidth. The possibility of such use of an input filter is not readily apparent because the input filter may affect the basic-circuit performance in unexpected ways through coupling at any of the many frequencies generated in the superregenerative amplifier. However, an acceptance band no broader than the desired signal band may be achieved as follows. A high-Q circuit is used as the resonant curcuit 6 so that, without the input filter, the acceptance band separates into several sub-bands, spaced by the quench frequency, and such that one of the sub-bands is of appropriate width and location to pass the desired-signal band. An input filter 4 adjusted to pass the same desired-signal band is coupled to the resonant circuit sufficiently weakly to avoid substantially modifying the performance of the resonant circuit 6 (either by loading it so as to broaden its acceptance sub-bands, or by causing instability similar to that possible in regenerative circuits) and yet sufficiently strongly to provide substantial over-all superregenerative gain. The effect of such an input filter is to eliminate, for practical purposes, all of the basic-circuit acceptance sub-bands except the one that passes the desired signal.

Figure 2:
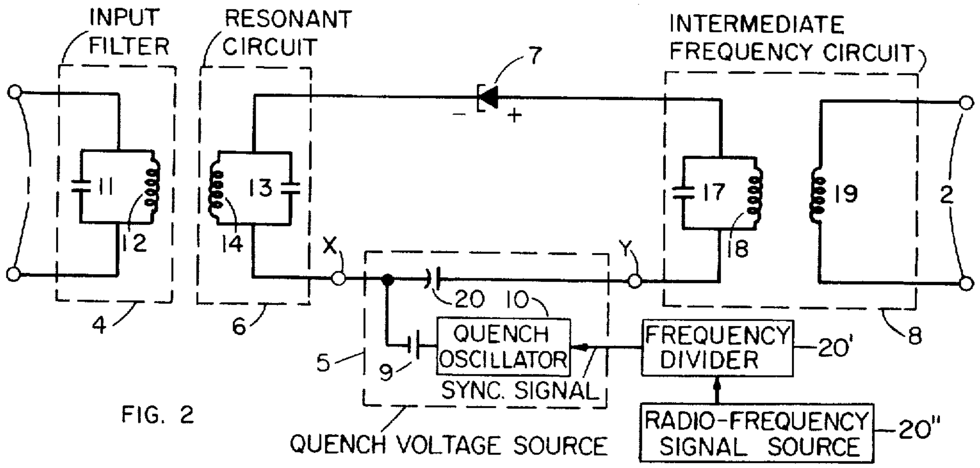
FIG. 2 is a schematic circuit diagram of a particular form that may be given to the circuit illustrated in FIG. 1.

In FIG. 2 is shown a schematic circuit of a superregenerative mixer in which details are given for one form that may be taken by each of the parts shown more generally in FIG. 1. The input filter 4 is shown consisting of a capacitance 11 and inductance 12, and the resonant circuit 6 is shown consisting of a capacitance 13 and inductance 14, coupling between the input filter 4 and resonant circuit 6 being provided by mutual inductance between inductances 12 and 14. The combination of the input filter and the resonant circuit form a double-tuned circuit that performs the filter and resonant-circuit functions, and it serves, also, as a means for adapting the superregenerative circuit to the impedance characteristics of the source of radio-frequency signals with which it is used. In practice the devices used to construct the input filter 4 and the resonant circuit 6 in FIGS. 1, 2 and 3 may be lumped elements, as the capacitances and inductances illustrated, or sections of transmission lines or waveguides, or optical components, or combinations of such devices, and the coupling between the input filter and resonant circuit may be provided by mutual inductance, as illustrated, or by any other well-known coupling means, including direct connection, self-inductance, capacitance, and apertures in conducting walls.

The intermediate-frequency circuit 8 illustrated in FIG. 2 comprises a capacitance 17 and an inductance 18, tuned to be resonant at the intermediate frequency, together with an inductance 19 coupled by mutual inductance to the inductance 18, the combination serving as a transformer to provide proper impedance characteristics at the intermediate-frequency output terminals 2—2. A capacitance may be added to the circuit to tune the inductance 19, and, in fact, the intermediate-frequency circuit can be constructed as any combination of circuit elements that offers substantial impedance to tunnel-diode currents only in the intermediate-frequency band and provides proper output-terminal impedance characteristics.

Figure 2A:
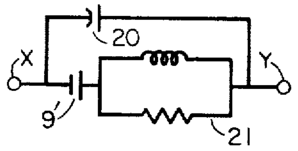
FIG. 2A illustrates a modification that may be substituted for the quench-voltage source shown in FIG. 2.

The quench-voltage source 5, connected between X and Y in the circuit, is shown consisting of a battery 9 in series with a quench oscillator 10 which may be any electronic oscillator circuit capable of producing the quench-voltage variation described previously, and a by-pass capacitor 20 which, in combination with the capacitance 17 in the intermediate-frequency circuit, assures that the entire signal voltage across the resonant circuit 6 appears also across the tunnel diode 7. In practice the quench-voltage source may be any device or combination of devices that provides a variable voltage to move the tunnel-diode operating point over a range such as A–C or C–E on the curve in FIG. 4, as described previously. In particular, in place of a separate source of varying voltage, such as the quench oscillator 10, a source of electrical power, as the battery 9' in FIG. 2A, may be used in combination with circuit impedance elements (shown as an RL circuit 21) having appreciable impedance only in the quench-frequency region, and the tunnel diode 7 to produce self-quenching, that is, the generation of quench-frequency voltage variations by virtue of the negative-conductance characteristic of the tunnel diode.

The invention has been discussed in connection with a tunnel-diode, but the concept is useful, also, in connection with other active devices such as, for example, vacuum tubes, transistors, masers, lasers, and parametric amplifiers, as well. These and other modifications of the present invention will occur to those skilled in the art and all such modifications are considered to be within the spirit and scope of the invention as defined in the appended claims.

What is claimed is:

1. A superregenerative mixer comprising, in combination, a resonant circuit having an input to receive a radio-frequency signal and having its resonant frequency substantially at the center frequency of said radio-frequency signal, a tunnel diode electrically connected to the resonant circuit, bias means electrically connected in the mixer circuit for establishing an operating point on the tunnel diode current versus voltage characteristic, quench means electrically connected to said tunnel diode and operable to move the operating point of said tunnel diode between regions of negative and positive incremental conductance at a quench frequency much less than the frequency of said signal to cause oscillations in said resonant circuit periodically to grow and decay at the quench frequency, said radio-frequency signal and high-order harmonics of the quench frequency being amplified and mixed by the tunnel diode to produce a resultant intermediate-frequency signal, and intermediate-frequency circuit means electrically connected to said tunnel diode to separate the intermediate-frequency signal generated in said tunnel diode from other signals and couple the intermediate-frequency signal thereby derived to an output, said quench means being operable to provide a quench frequency one of whose high-order harmonics differs from the radio-frequency signal by the frequency of the intermediate-frequency signal, thereby providing a plurality of quench-frequency high-order harmonics to beat with the plurality of frequency components of the amplified radio-frequency signal to produce said intermediate-frequency.

2. A superregenerative mixer as claimed in claim 1 in which an input filter is connected between said input and said resonant circuit, the bandwidth of said input filter being less than the quench frequency thereby to remove unwanted frequencies from the input signal, said input filter being coupled to the resonant circuit sufficiently weakly to avoid substantially modifying the performance of the resonant circuit.

3. A superregenerative mixer as claimed in claim 2 and in which said input filter and said resonant circuit, in combination, form a double-tuned circuit.

4. A superregenerative mixer as claimed in claim 1 and in which the quench means is a quench-frequency oscillator.

5. A superregenerative mixer as claimed in claim 1 in which the quench means is a source of electrical power in combination with an impedance and the said tunnel diode.

6. A superregenerative mixer as claimed in claim 1 and in which the quench means is controlled in frequency by a source that is coherent in phase with the input signal to effect phase coherence between the input and the output signals.

7. A superregenerative mixer comprising, in combination, a resonant circuit having an input to receive a radio-frequency signal and having its resonant frequency substantially at the center frequency of said radio-frequency signal, an active device electrically connected to the resonant circut, bias means electrically connected in the mixer circuit for establishing an operating point on the current versus voltage characteristic of the active device, quench means electrically connected to the active device and operable to move the operating point of said active device between a region in which oscillations grow and a region in which oscillations decay to cause oscillations in said resonant circuit periodically to grow and decay at a quench frequency, said radio-frequency signal and high-order harmonics of the quench frequency being amplified and mixed by the active device to produce a resultant intermediate-frequency signal, and intermediate-frequency circuit means electrically connected to said active device to separate the intermediate-frequency signal generated in said active device from other signals and couple the intermediate-frequency signal thereby derived to an output, said quench means being operable to provide a quench frequency one of whose high-order harmonics differs from the radio-frequency signal by the frequency of the intermediate-frequency signal, thereby providing a plurality of quench-frequency high-order harmonics to beat with the plurality of frequency components of the amplified radio-frequency signal to produce said intermediate frequency.

8. A superregenerative mixer as claimed in claim 7 in which an input filter is connected between the input and the resonant circuit, the bandwidth of said input filter being less than the quench frequency thereby to remove unwanted frequencies from the input signal, said input filter being coupled to the resonant circuit sufficiently weakly to avoid substantially modifying the performance of the resonant circuit.

9. A superregenerative amplifier comprising, in combination, an input filter to receive a radio-frequency signal, a resonant circuit electrically coupled to the input filter and having its resonant frequency substantially at the center frequency of said radio-frequency signal, an active device electrically connected to the resonant circuit, bias means electrically connected into the amplifier circuit for establishing an operating point on the current versus voltage characteristic of the active device, and quench means electrically connected to the active device and adapted to move the operating point of said active device between a region in which oscillations grow and a region in which oscillations decay to cause oscillations in said resonant circuit periodically to grow and decay at a frequency, the bandwidth of said input filter being less than the quench frequency thereby to exclude unwanted frequencies from the radio-frequency signal and said input filter being coupled to the resonant circuit sufficiently weakly to avoid substantially modifying the performance of the resonant circuit.

10. A superregenerative amplifier as claimed in claim 9 and in which said input filter and said resonant circuit, in combination, form a double-tuned circuit.

11. A superregenerative amplifier as claimed in claim 9 and in which the quench means is a quench-frequency oscillator.

12. A superregenerative amplifier as claimed in claim 9 in which the quench means is a source of electrical power in combination with an impedance and the said active device.

13. A superregenerative amplifier as claimed in claim 9 and in which the said active device is a tunnel diode.

14. A superregenerative amplifier as claimed in claim 9 in which the resonant circuit in combination with the active device has a plurality of separate acceptance bands one of which passes a desired-signal band and in which said input filter passes the same desired-signal band.

15. A method of superregeneratively amplifying and changing the freqency of a radio-frequency signal to provide and intermediate-frequency output, that comprises: introducing the radio-frequency signal as an input to a resonant circuit and an active device electrically connected to the resonant circuit, biasing the active device to establish an operating point on the current versus voltage characteristic thereof, moving the operating point of the active device between a region in which oscillations grow and in which oscillations decay to cause oscillations in said resonant circuit periodically to grow and decay at a quench frequency, adjusting the quench frequency to provide a frequency whose high-order harmonics differ from the frequency components of the amplified radio-frequency signal by the frequency of the intermediate-frequency signal, amplifying said radio-frequency signal and mixing the frequency components of the amplified radio-frequency signal with said high-order harmonics of the quench frequency in the active device to produce a resultant intermediate-frequency signal, separating the intermediate-frequency signal generated in said active device from other signals, and coupling the intermediate-frequency signal thereby derived to an output.

16. A method as claimed in claim 15 that includes providing an input filter between the input to the circuit and the resonant circuit which, in this instance, has an acceptance band in the absence of filtering that separates into several sub-bands spaced by the quench frequency, one of the sub-bands being of appropriate width and location in the spectrum to pass the desired-signal band, adjusting the input filter to pass the same desired-signal band, and coupling the input filter to the resonant circuit sufficiently weakly to avoid substantially modifying the performance of the resonant circuit.

17. A method of superregeneratively amplifying a radio-frequency signal, that comprises: introducing the radio-frequency signal to a resonant circuit and an active device, electrically connected to the resonant circuit, through an input filter; biasing the active device to establish an operating point on the current versus voltage characteristic thereof; moving the operating point of the active device between a region in which oscillations grow and a region in which oscillations decay to cause oscillations in said resonant circuit periodically to grow and decay at a quench frequency; adjusting the resonant circuit and the growth and decay of oscillations so that the resonant circuit has an acceptance band, in the absence of filtering, that separates into several sub-bands spaced by the quench frequency; one of the sub-bands being of appropriate width and location in the spectrum to pass the desired-signal band; adjusting the input filter to pass the same desired-signal band; and coupling the input filter to the resonant circuit sufficiently weakly to avoid modifying the performance of the resonant circuit.

* * * * *